(No Model.)
B. F. BURGESS.
GUARD FOR FISH HOOKS.
No. 534,682. Patented Feb. 26, 1895.
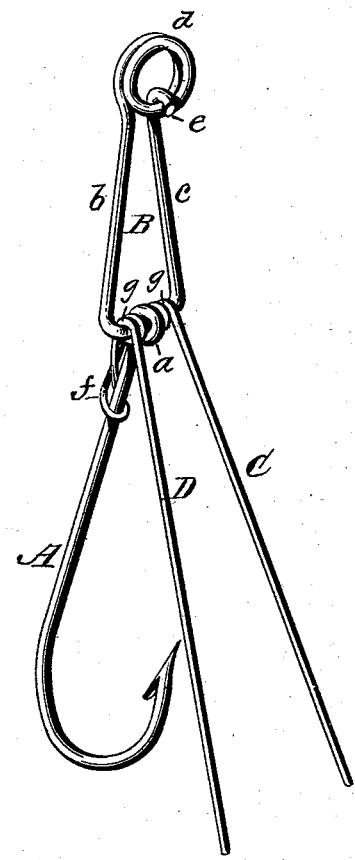
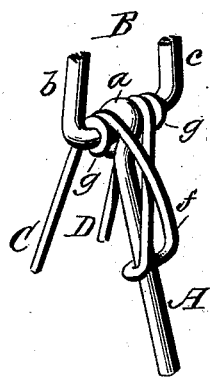
Witnesses
C. J. Williamson.
G. Goddard.
Inventor
Benjamin F. Burgess,
per Chas. H. Fowler
Attorney.

UNITED STATES PATENT OFFICE.

BENJAMIN F. BURGESS, OF JACKSON, MICHIGAN.

GUARD FOR FISH-HOOKS.

SPECIFICATION forming part of Letters Patent No. 534,682, dated February 26, 1895.

Application filed November 10, 1894. Serial No. 528,410. (No model.)

*To all whom it may concern:*

Be it known that I, BENJAMIN F. BURGESS, a citizen of the United States, residing at Jackson, in the county of Jackson and State of Michigan, have invented certain new and useful Improvements in Guards for Fish-Hooks; and I do hereby declare that the following is a full, clear, and exact description of the same, reference being had to the annexed drawings, making a part of this specification, and to the letters of reference marked thereon.

The present invention has relation to that class of devices for attachment to a fish-hook or used in connection with the ordinary spoon-bait to prevent them from becoming entangled in weeds and other like substances when trolling or casting.

The object of the invention is to provide a guard for the purpose above described formed of flexible or spring arms that will carry the hook over, across, or through weeds or other like substance without engaging it therewith by reason of the flexibility of the arms, which, while resisting the weeds or other obstruction, a slight pressure upon the spring arms will expose the point of the hook for the purpose designed and thereby in no way interfere with the utility of the hook for catching fish.

The invention consists in a guard constructed substantially as shown in the drawings and hereinafter described and claimed.

Figure 1 of the drawings represents a perspective view of a fish hook showing my improved guard connected thereto. Fig. 2 is a detail view in perspective and on an enlarged scale showing the manner of attaching the guard to the hook.

In the accompanying drawings A represents a fish-hook of any of the ordinary forms and which shank terminates in an eye $a$, and to this eye is connected a spring bail B. The arms $b$ $c$ of this bail terminate respectively in a loop $d$ and a hook $e$, which hook is adapted to engage with the loop, as shown in Fig. 1 of the drawings. This bail B may be of any suitable construction so long as one of the arms are adapted to be connected or disconnected from the other arm, and to this bail may be connected in any suitable manner the usual spoon-bait, which is not considered essential to show in the drawings.

The end of the usual fish-line is connected to the bail B, and by a slight pressure upon the arm $c$ will enable the hook $e$ thereon to be disengaged from the loop $d$, thus permitting the substitution of a new fish-hook when found necessary.

The guard is constructed from a single length of spring wire and so bent as to present the two spring-arms C D, which are of sufficient length to form a guard to the point of the fish-hook. It is not essential that the guard be constructed of a single piece of wire, as two or more pieces may be used as found preferable.

The spring arms of the guard will readily yield when a slight pressure is brought against them and expose the point of the hook for the purpose intended, but when the arms are in their normal position as indicated in Fig. 1 of the drawings, they will form a guard whereby the hook can readily and easily pass over weeds or other obstructions without engaging therewith.

The guard in its construction and attachment to the hook and the bail, a suitable length of spring wire is provided, which is bent at its center and brought around the shank of the fish-hook in the form of a yoke $f$, the wire being crossed and bent around the lower portion of the bail B to form eyes $g$ $g$.

The yoke $f$ and eyes $g$ $g$ of the guard will admit the hook and guard being removed from the bail B by first disconnecting the hook $e$ from the loop $d$ and slipping the fish-hook and guard off the hooked end of the arm, after which the fish-hook can be readily removed from the yoke $f$, said yoke being sufficiently large to pass over the point of the hook.

Having now fully described my invention, what I claim as new, and desire to secure by Letters Patent, is—

1. The combination with a fish-hook, of a spring-bail having its arms detachably connected with each other, and a guard having its arms detachably connected to the bail and hook, substantially as and for the purpose set forth.

2. A guard for fish-hooks, consisting of spring-arms having a yoke for the shank of the fish-hook, and eyes for attaching it to a suitable bail, substantially as and for the purpose described.

3. The combination with a fish-hook, of a bail having its arms detachably connected to each other, and a guard consisting of spring arms having eyes for connecting it to the bail, and a yoke for connecting it to the fish-hook, substantially as and for the purpose set forth.

In testimony that I claim the above I have hereunto subscribed my name in the presence of two witnesses.

BENJAMIN F. BURGESS.

Witnesses:
HULL G. SUTTON,
CHAS. B. WOOD.